United States Patent [19]
Takagi et al.

[15] 3,687,585
[45] Aug. 29, 1972

[54] APPARATUS FOR MANUFACTURING SYNTHETIC RESIN TUBE PROVIDED WITH HEAT-SHRINKING PROPERTY

[72] Inventors: Haruo Takagi, 9 Saiwaicho-dori, 5-chome, Naniwa-ku; Yasuo Yamagishi, 660, Shinke-cho, Osaka, both of Japan

[22] Filed: Jan. 2, 1970

[21] Appl. No.: 225

[52] U.S. Cl. ..................425/71, 264/95, 425/327, 425/384
[51] Int. Cl. ...........................................B29c 17/00
[58] Field of Search ....18/19 TM, 14 S, 1 FS; 264/95

[56] References Cited

UNITED STATES PATENTS

| | | | |
|---|---|---|---|
| 3,370,112 | 2/1968 | Wray | 18/145 X |
| 3,086,242 | 4/1963 | Cook et al. | 18/1 FM X |
| 3,456,044 | 7/1969 | Pahlke | 18/145 X |
| 2,582,165 | 1/1952 | Rosefeld | 18/19 TM |
| 1,942,990 | 1/1934 | Voss | 18/14 S |

FOREIGN PATENTS OR APPLICATIONS

| | | | |
|---|---|---|---|
| 25,836 | 0/1968 | Japan | 18/19 TM |

Primary Examiner—J. Spencer Overholser
Assistant Examiner—David S. Safran
Attorney—Holman, Glascock, Downing & Seebold

[57] ABSTRACT

Apparatus for manufacturing a thermoplastic synthetic resin tube whose diameter shrinks to its original diameter when re-heated using the method comprising the steps of inflating a softened material tube with air in a heater cylinder of larger diameter to enlarge the original tube diameter, then cooling it rapidly and finally winding same flat onto a reel through take-up rolls. The thus finished tube has an increased outlet for covering or sealing application on dry cells, bamboo rods, bottle-caps, etc. because of its shrinking to the original diameter by re-heating.

4 Claims, 2 Drawing Figures

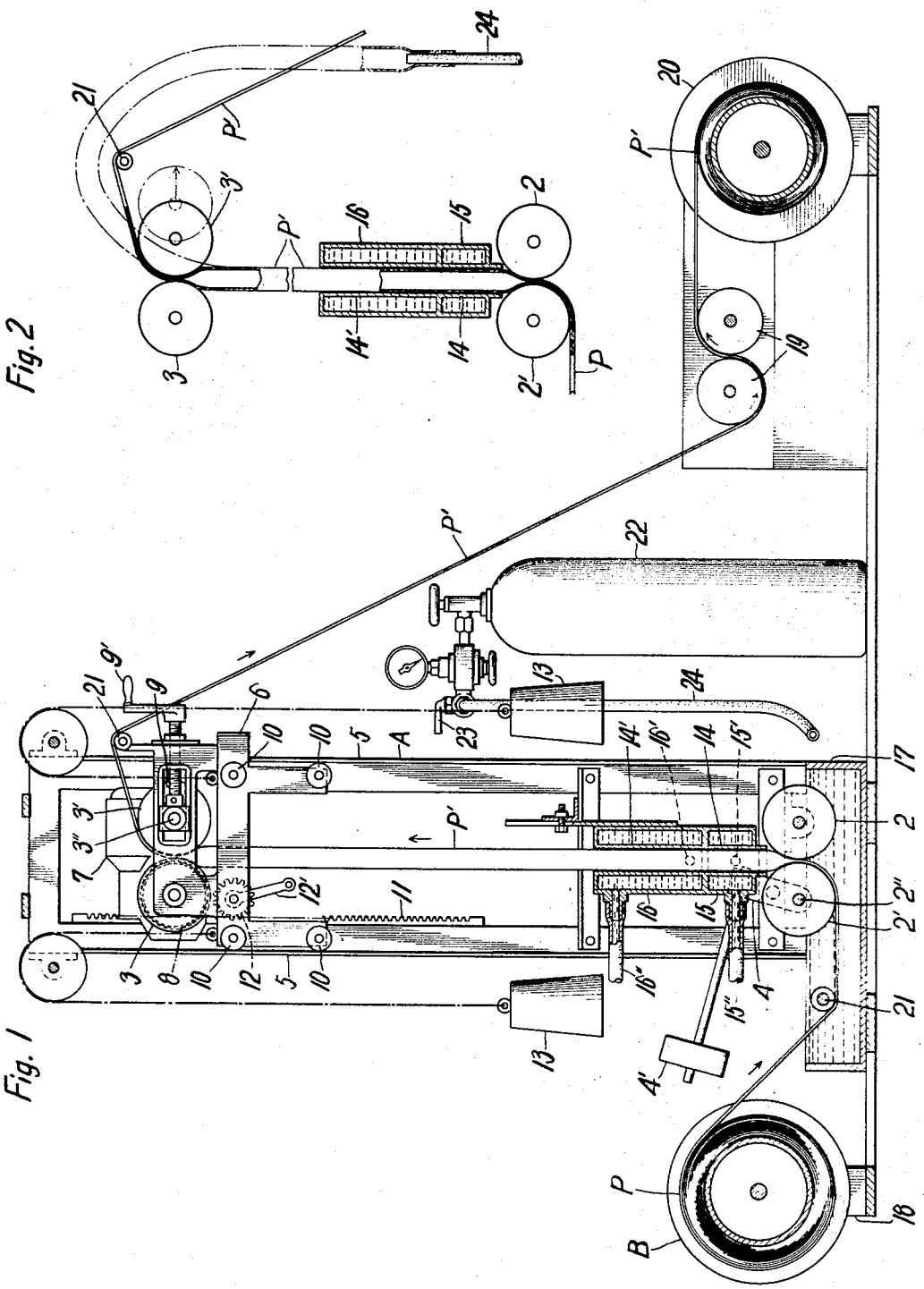
PATENTED AUG 29 1972
3,687,585
INVENTORS
H. TAKAGI
Y. YAMAGISHI
BY Holman, Glascock, Downing & Seebold
ATTORNEYS

APPARATUS FOR MANUFACTURING SYNTHETIC RESIN TUBE PROVIDED WITH HEAT-SHRINKING PROPERTY

BACKGROUND OF THE INVENTION

This invention relates to apparatus for manufacturing a thermoplastic synthetic resin tube provided with such property that its tube diameter becomes smaller when heated again and more particularly this invention has for an object to impart such property to a synthetic resin tube.

It is known that when a thermoplastic synthetic resin tube was softened by re-heating after its extrusion from an extruding machine and expanded to a larger diameter than that in which it had originally been extruded, the thus finished tube comes to possess such a characteristic that it shrinks and returns to the original diameter when heated again afterward for actual application, thereby providing air-tight sealing or covering for the goods to which the tube was applied.

In accordance with the known methods, however, the manufacture of this heat-shrinking tube required rather complicated and expensive process and apparatus, thereby making its manufacture highly uneconomical. With the present apparatus, the original tube is continually fed into the diameter-expanding apparatus where it is simply inflated with air to the diameter defined by a suitable heater cylinder, then cooled down rapidly and finally wound onto a beam in a continuous process.

SUMMARY OF THE INVENTION

This invention has for its principal object to provide the improved apparatus for manufacturing such heat-shrinking tube and more particularly to provide apparatus a for producing continuously, smoothly and efficiently a thermoplastic synthetic resin tube with such heat-shrinking properties.

The nature and other advantages of this invention will be known more clearly from the following descriptions made with reference to the accompanying drawings.

BRIEF DESCRIPTION OF DRAWINGS

FIG. 1 is a front elevation in vertical section of the apparatus in accordance with the present invention, including a compressed air cylinder which constitutes the source of air supply.

FIG. 2 is a front elevation in section of part of the apparatus, showing the state where an extruded material tube is inflated for a certain predetermined length or section with compressed air.

DETAILED DESCRIPTION OF THE INVENTION

Referring to the embodiment shown in the drawings, a material tube P extruded from an extruder is wound flat onto a reel B. Placed opposite to the reel B is a tube-expanding apparatus for expanding the diameter of the tube, which carries a set of opposed nipper rolls 2, 2' at the lower end of its frame A and a similar set of nipper rolls 3, 3' at the opposite upper end of the frame A.

Out of the above twin lower rolls 2, 2', the roll 2' is arranged in such a way by mounting its axis 2'' on the internal end of a L-shaped lever 4 that it normally maintains contact with the opposite roll 2 but if it is desired, moves away from the latter by moving the said lever 4 upward. The said L-shaped lever 4 carries a weight 4' at its external end.

The upper twin rolls 3, 3' are mounted on a vertically movable platform 6 which is slidably mounted on oppositely-disposed support pole members 5, 5 constituting the frame A of the apparatus.

The roll 3, one of the twin nipper rolls 3, 3', is so disposed as to rotate by operative connection with a motor 7 through an intermediary gear wheel 8 while the other roll 3' is caused to rotate by receiving a rotatory motion from the roll 3. The latter roll 3' is normally held in contact with the roll 3 by means of a screw rod 9 having its base end linked to the axis 3'' of the roll 3' and carrying a handle 9' at its free external end. When said screw rod 9 is screwed inwardly by turning the handle 9', its inner end is caused to press the roll 3' against the roll 3, and on the contrary, if the rod 9 is screwed outwardly by turning the handle reversely, the roll 3' is released from contact with the roll 3, thus providing a space between the rolls 3 and 3'.

The vertically-movable platform 6 straddling the said support pole members 5, 5 and carrying thereon the upper twin rolls 3, 3' is so arranged that it is slideably vertically along the inner side of the support members 5, 5 as dictated by the rotation of a roll 10. The positioning of the saidplatform 6 on the support members 5, 5 is effected by engagement of a rack 11 provided on the inner side of one of the support members 5 with a pinion 12 disposed on the platform 6. The positioning is made by turning an operating lever 12' carried at the external end of the pinion 12, and when the position of the platform 6 was set, it is held in that position by means of balance weights 13, 13 which are respectively connected by means of cord or chain to said platform.

Provided immediately above the lever nipper rolls 2, 2' and adjacent to said rolls in a cylindrical heating chamber 15 upon which a cylindrical cooling chamber 16 is laid coaxially. The cylindrical heating chamber 15 and the cylindrical cooling chamber 16 carry respectively central holes or chambers 14 and 14' therein.

The central hole 14 of the heating chamber 15 is of such diameter that determines the outer diameter of a tube to be enlarged. On the other hand, provided immediately below the lower rolls 2, 2' is a preparatory heating bath 17 filled with hot water. One side of the frame A is provided a support stand 18 to rotatably support the reel B on which the material tube P was wound, while on the other side of the frame A are provided a set of take-up rolls 19, 19 to take up the thus expanded tube from the expanding apparatus and then a reel 20 onto which the finished tube is to be wound flat. Guide rolls 21 are provided at several places on the frame A to guide the tube P smoothly from the beam B to take-up rolls 19.

In the drawings, 22 indicates a compressed air cylinder, 23 its opening valve and 24 a guide pipe for compressed air. 15' indicates an inlet for the hot water which circulates inside the heating chamber 15, and 15'' an outlet for the water, whereas 16' indicates an inlet for the cold water which circulates inside the cooling chamber 16, and 16'' an outlet therefor.

Now, referring in detail to the process of expanding the diameter of the material tube P, a weight 4' is lifted up to separate one 2' of the lower nipping rolls 2, 2' from the other 2 to provide a space between these rolls. Likewise, the screw handle 9 is operated to separate one 3' of the upper nipping rolls 3, 3' from the other 3 to provide a space between them. A starting end of the flat material tube P, wound on the reel B, is then released from the reel to be led past the guide roll 21, through the pre-heating bath 17 and to the space between the twin lower nipping rolls 2 and 2'. It is further led through the tubular moulding chambers 14 14', through the space between the upper rollers 3 3' and then led outside over the guide roll 21 provided there. Then, the lower rolls 2 and 2' are restored to the normal position of pressure contact with each other by lowering the weight 4', thereby bringing the roll 2' into pressure contact with the roll 2, after which compressed air in the cylinder 22 is inducted from the starting end of said material tube P to inflate the tube for the length or part limited by the lower nipping rolls 2, 2' to the full inside diameter of the moulding chambers 14, 14' to obtain an expanded tube diameter, whereupon the upper nipping rollers 3, 3' are restored to the position of pressure contact by the turning of the screw handle 9 to press the roll 3' inwardly until it abut against the roll 3.

By the above operation, the material tube, for the length or part defined by the lower nipping rolls 2, 2' and the top nipping rolls 3, 3', is fully filled with air and the tube is kept in a ballooned state for that particular part.

With the parts so arranged, the material tube is heated in the pre-heating bath 17 for slight softening, after which it is heated in the heating unit 15 to be sufficiently softened, so that it is natural that the said material tube, when filled with air, should expand in diameter up to the full area covered by the tubular moulding chamber, and also it is natural for the diameter-expanded tube, when suddenly cooled in the subsequent cooling chamber 16, to get solidified in that state.

Thus, the tip of the thus expanded tube is further drawn forward, and led through the take-up roll 19 to the winding reel 20. With the start of the machine operation then, the tractive force caused by the rotation of the take-up roll 19 and the main roll 3 of the upper nipping rolls 3, 3' works to draw the material tube forward in the order of the pre-heating bath 17, the heating unit 15 and the cooling chamber 16, and the tube is consecutively drawn forward, during which time the tube comes to have an expanded diameter successively by the inner pressure of air filled up in the section defined between the lower nipping rolls 2, 2' and the upper nipping rolls 3, 3', and the said diameter-expanded finished tube P' is pressed to a flat state again at the time of passing through the pressure-contact point of the upper nipping rolls 3, 3', and continuously wound onto the winding reel 20.

In this case, some amount of the air charged in the tube in the section between the lower nipping rolls 2, 2' and the upper rolls 3, 3' is lost to a slight degree as the tube is drawn upward above the pressure-contact point of the upper nipping rolls 3, 3', resulting in gradual drop of the air pressure. In such a case, the pinion 12 geared to the rack 11 is operated to bring down the platform 6 of upper nipping roll to shorten the air-charged section thereby making it possible to maintain the inner air pressure of the air-charged portion to the state originally set. And, when the shortening of the air-charged section comes to the extremity, in other words, when the platform 6 was brought down to its lowest position, the compressed air may be charged afresh by the same operation as done in the beginning.

As aforementioned, the apparatus of this invention provides continuous and smooth processing of a thermoplastic synthetic resin tube under which the tube is given a heat-shrinking property to suit particular applications.

We claim:

1. Apparatus for continuously producing a heat-shrinkable plastic tubing, comprising in combination:
   A. means for continuously supplying thermoplastic tubing to be dimensionally reoriented to have heat-shrinkable characteristics;
   B. frame means including relatively spaced upstream and downstream pairs of nipper rolls journaled thereon for receiving a run of the tubing to be treated therebetween, said nipper roll pairs including means for trapping an air bubble therebetween and means for maintaining the air bubble at a substantially stable pressure for maintaining uniformity of production without reinflating the run of tubing between the nipper rolls;
   C. power means operatively connected to said rolls for continuously drawing the tubing through the pairs of rolls while the run therebetween is substantially uniformly inflated;
   D. heating and cooling means for said tubing on said frame and disposed in series between said downstream and upstream roll pairs for heating the tubing to cause it to radially expand and cooling the tubing while expanded whereby the tubing has heat-shrinkable characteristics when subsequently reheated, said means for maintaining the substantially stable pressure in said run of tube between the nipper rolls comprising an adjustable mounting including means for longitudinally spacing the rolls in relation to the run of tubing therebetween and the pressure of the air bubble trapped therein.

2. The combination as claimed in claim 1 in which said adjustable mounting comprises a platform reciprocably supported on said frame and upon which said pair of upstream nipper rolls are journaled.

3. The combination as set forth in claim 2 in which said power means is mounted on said platform and is operatively connected to one of the rolls of said upstream pair, and counterbalance means on said frame and operatively connected to said platform for facilitating relative longitudinal spacing between said nipper roll pairs.

4. Apparatus for continuously producing a heat-shrinkable plastic tubing, comprising in combination:
   A. means for continuously supplying thermoplastic tubing to be dimensionally reoriented to have heat-shrinkable characteristics;
   B. frame means including relatively spaced upstream and downstream pairs of nipper rolls journaled thereon for receiving a run of the tubing to be treated therebetween, said nipper roll pairs including means for trapping an air bubble therebetween and means for maintaining the air bubble at a substantially stable pressure for maintaining uniformity of production without reinflating the run of tubing between the nipper rolls;

C. power means operatively connected to said rolls for continuously drawing the tubing through the pairs of rolls while the run therebetween is substantially uniformly inflated;

D. heating and cooling means for said tubing on said frame and disposed in series between said downstream and upstream roll pairs for heating the tubing to cause it to radially expand and cooling the tube while expanded whereby the tubing has heat-shrinkable characteristics when subsequently reheated, said heating and cooling means comprising axially aligned tubular chambers respectively including means for circulating a heating and cooling medium therein, said tubular chambers including axial passages through which the tubing being treated is passed and said passages defining the cross section to which the treated tubing is expanded.

* * * * *